2 Sheets--Sheet 1.

A. FOX.
Corn-Planter.

No. 168,632. Patented Oct. 11, 1875.

Witnesses:
V. S. Ferguson
C. N. Munson

Inventor:
Alpheus Fox

2 Sheets--Sheet 2.

A. FOX.
Corn-Planter.

No. 168,632. Patented Oct. 11, 1875.

Witnesses:
V. S. Ferguson
C. N. Murdson

Inventor:
Alpheus Fox

UNITED STATES PATENT OFFICE.

ALPHEUS FOX, OF ROCK FALLS, ILLINOIS.

IMPROVEMENT IN CORN-PLANTERS.

Specification forming part of Letters Patent No. 168,632, dated October 11, 1875; application filed February 10, 1875.

*To all whom it may concern:*

Be it known that I, ALPHEUS FOX, of Rock Falls, Whitesides county, Illinois, have invented a new and useful Improvement on Corn-Planters; and I do hereby declare that the following is a full, clear, and exact description of the construction and operation of the same, reference being had to the annexed drawings, making a part of this specification.

This invention consists, in part, of the frame, runners, wheels, grain-boxes, and lever, as ordinarily used in two-horse corn-planters.

Figure 1:
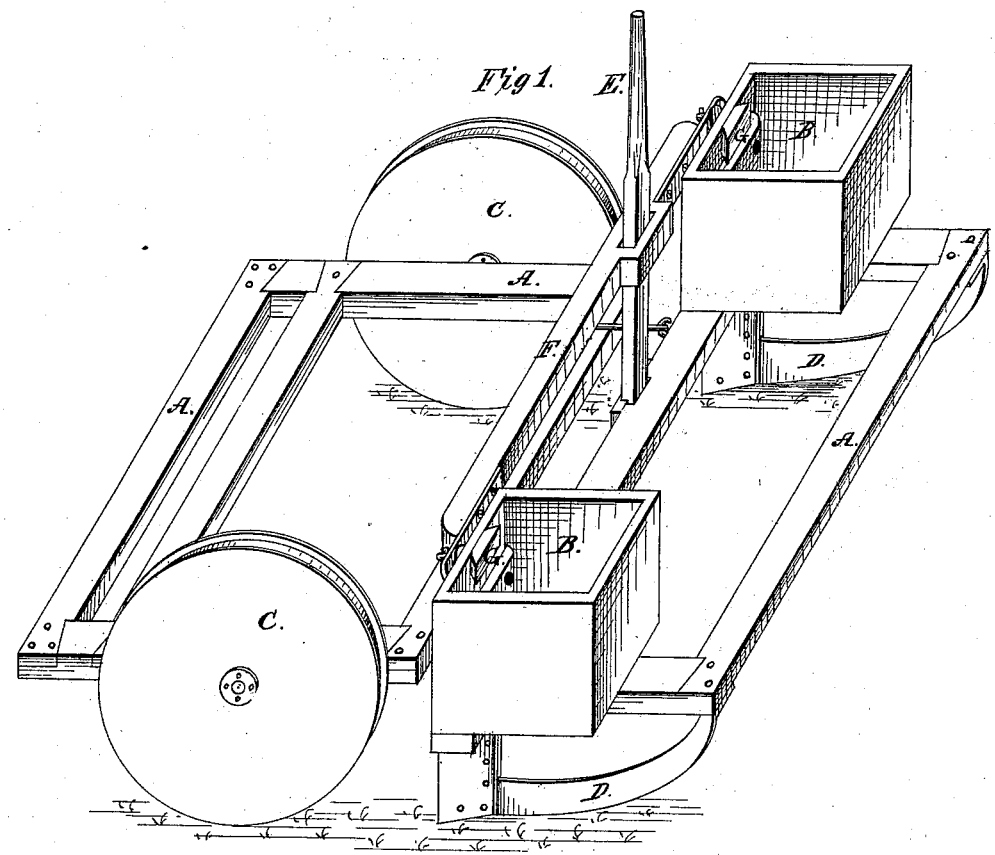
Figure 2:
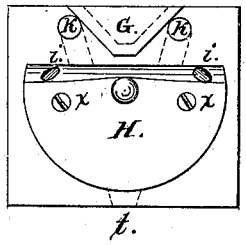
Figure 3:
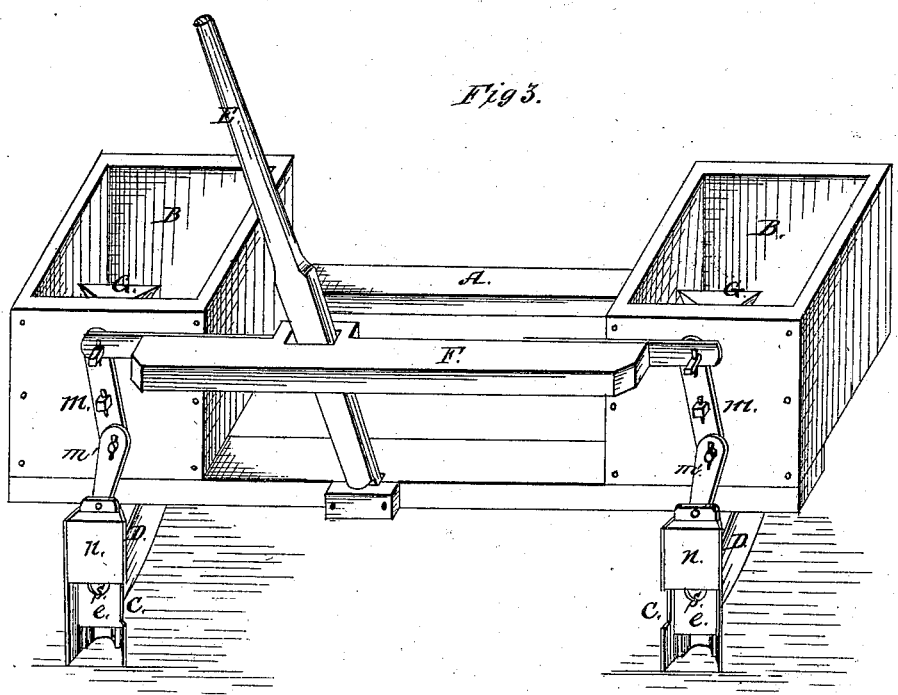
Figure 4:
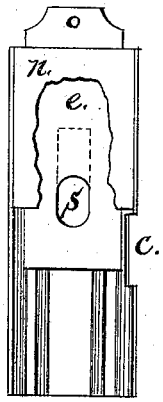

The dropping apparatus consists of a half-wheel, having its upper edge beveled outward, attached inside and to the back of the grain-box, working on a square bolt by the lever and cross-bar, as at $m\ m$, Fig. 3. In the upper edge of the half-wheel are two beveled holes, whose diameters increase downward, and whose direction is first downward and then to the inside surface of the half-wheel, by which the grain is deposited first from the bottom of the holes $i\ i$, Fig. 2 of drawings, into the openings K K, the grain thence passing downward into upper part of runner $n$, Fig. 3. The size of the holes $i\ i$ is regulated by means of a slot, on inside of half-wheel, adjusted and held by screws $x\ x$, Fig. 2. G, as seen in Figs. 1, 2, 3 of drawings, is a stop with a beveled edge, to correspond with the bevel of half-wheel, to prevent the grain escaping from the holes $i\ i$. $n\ e$, Figs. 3 and 4, is a second drop, $n$ being a small box, into which the corn is deposited through $t$, Fig. 2. $e$, in Figs. 3 and 4, is a slide, operated by lever E, in lower end of which is an aperture, $s$, Figs. 2 and 3, which carries the grain down and out of box $n$, liberating it in heel of runner. $c$, Figs. 3 and 4, is a notch cut out of the inner upright edge of runner to enable the dropper to see the grain as it falls from second drop into the ground.

I claim—

1. The vertical segmental seed-wheel H, pivoted within the hopper and having its upper edge beveled, and provided with inclined holes $i\ i$, by which the grain is picked up and deposited in the openings K K, substantially as specified.

2. The pivoted segmental seed-wheel H, in combination with the beveled stop G, substantially as and for the purposes specified.

3. The combination of the pivoted segmental seed-wheel H, pivoted levers $m\ m'$, and perforated slide $e$ S, with the hopper and seed-tubes, substantially as and for the purposes described.

ALPHEUS FOX.

Witnesses:
V. S. FERGUSON,
CH. H. DYER.